March 29, 1938.

R. E. WOOLLEY 2,112,683

MEASURING APPARATUS

Filed July 6, 1935

INVENTOR.
REW E. WOOLLEY
BY
Raymond D. Junkins
ATTORNEY.

Patented Mar. 29, 1938

2,112,683

UNITED STATES PATENT OFFICE 2,112,683

MEASURING APPARATUS

Rew E. Woolley, Shaker Heights, Ohio, assignor to Bailey Meter Company, a corporation of Delaware Application July 6, 1935, Serial No. 30,058

14 Claims. (Cl. 73—233)

This invention relates to apparatus for measuring the magnitude of a variable quality, quantity, condition, relation, etc., and particularly such variables as speed, electro-motive force, temperature, pressure, rate of fluid flow, etc., although the variable may be of any physical, chemical, electrical, hydraulic, thermal, or other nature or characteristic.

One object is to provide apparatus for differentiating an indication of quantity to obtain a record and/or indication of rate.

A further object is to provide a device wherein an indication of quantity or rate may be produced adjacent or remotely at a considerable distance from the actuator or primary element.

Another object is to provide apparatus for effecting synchronism between members in motion.

Still another object is to provide apparatus wherein such synchronism is effected through electrical means and wherein the current necessary to effect such synchronous operation may be utilized as an indication of the rate of movement of the members.

A further specific object is to provide apparatus for obtaining a record and/or indication of rate of flow from an indication of quantity produced by a displacement meter.

Further objects will be apparent from the following description and from the drawing, in which.

I have chosen to illustrate and will describe my invention as applied to the measurement of the rate of flow of a fluid, such as alcohol, benzol, fuel oil, molasses, paint or the like; the total volume of which is conveniently and accurately measured by a positive displacement meter having as a primary element a chamber or chambers through which the fluid passes in successive isolated quantities, either weights or volumes. These quantities may be separated from the stream and isolated by alternately filling and emptying containers of known capacity and fluid cannot pass through without actuating the primary device. The secondary element of such a meter normally consists of a counter with suitably graduated dials for indicating the total quantity that has passed through the meter up to the time of reading. It is frequently desirable, however, that an indication or record of the instantaneous rate of flow of such fluids be available, or that the secondary element be located remotely at a considerable distance from the primary element, and my invention as illustrated in Fig. 1 contemplates an exhibiting device producing such a record and/or indication, or remote integration, actuated by the shaft of the registering gear train or any other suitable shaft within the displacement meter.

Throughout the specification and the appended claims it is intended that exhibiting means shall denote any device or combination of devices for displaying in one or more forms the magnitude or other quality of the variable being measured. Thus it may denote a pointer which will provide an indication by observation of its movement or position with reference to a chart or graduated scale, or a device providing a permanent visible record of such indication, or a device providing an indication of the total flow up to the time of reading, or any desired combination of such devices.

Figure 1:
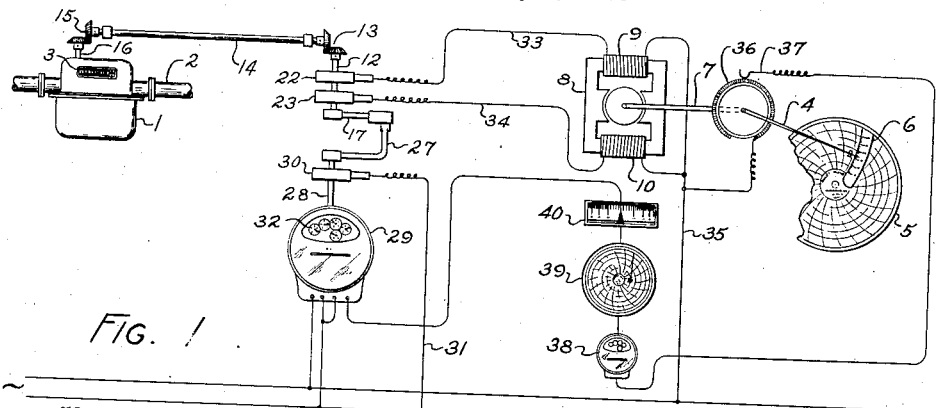
Fig. 1 is a diagrammatic illustration of an embodiment of my invention.

Referring to Fig. 1, I have therein shown a positive displacement meter 1 positioned in a pipe or conduit 2 for measuring the rate of flow of fluid therethrough. The meter 1 may be provided with a suitable secondary device, such as a register 3, from which the total flow passing through the pipe 2 up to the time of reading may be ascertained.

To record and/or indicate the rate of flow of fluid through the pipe 2 I provide a pen arm 4 cooperating with a suitably graduated time rotatable chart 5 to give a permanent visible record of the rate of flow; and also cooperating with an index or graduated scale 6 to give a showing of the rate of flow existing at the instant of observation. The arm 4 is operatively connected to a shaft 7 of a motor 8 having opposed fields 9 and 10 adapted to be energized from a suitable source 11. Energization of the field 9 effects positioning of the arm 4 in one direction, whereas energization of the field 10 effects positioning of the arm 4 in opposite direction. When both fields 9 and 10 are energized or deenergized, the shaft 7 does not rotate.

As shown in Fig. 1, my invention contemplates rotating a member at a speed proportional to the rate of flow of fluid through the pipe 2; rotating a second cooperating member at a speed proportional to the position of the arm 4; and varying the speed of the second member to maintain the speeds of the two members in synchronism, whereby the position of the arm 4 is an indication of the rate of flow of fluid through the conduit 2. To this end I show a rotatable contact member 12 driven by the meter 1 through suitable bevel gears 13, shaft 14, bevel gears 15, and an extension 16 secured to a gear train shaft or other suitable shaft (not shown) of the meter 1. The angular velocity of the extension 16 is proportional to the rate of flow of fluid through the pipe 2, and accordingly the angular velocity of the member 12 will likewise be proportional to the rate of flow of fluid through the pipe 2.

Figures 2, 3, 4, 5:
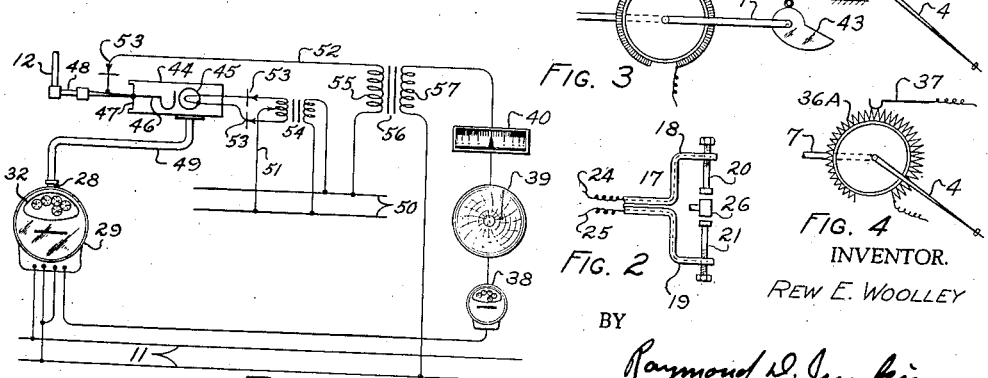
Fig. 2 is a fragmentary view of a part of the apparatus shown in Fig. 1.
Figs. 3 and 4 are fragementary views of modified forms of a part of the apparatus shown in Fig. 1.
Fig. 5 is a diagrammatic illustration of a modified form of my invention.

The rotatable member 12 carries an extension 17, shown more clearly in Fig. 2, provided with arms 18 and 19 carrying contacts 20 and 21 respectively. Also carried by the member 12 are slip rings 22 and 23 connected to contacts 20 and 21 respectively through suitable conductors 24 and 25 which may be carried through the extension 17 and member 12 through suitable passageways.

Normally in spaced relation with respect to the contacts 20 and 21 is a cooperating contact 26 carried by an arm 27 of a rotatably member 28 forming an extension of a suitable internal shaft (not shown) within an electro-responsive device 29. The contact 26 is connected to a slip ring 30 carried by the member 28 and which is electrically connected with one side of the source 11 through a conductor 31.

The electro-responsive device 29 connected to the source 11 may be an integrating watt meter or similar device wherein the internal shaft (not shown) rotates at a speed dependent upon the current passing through the device, for example it may be the shaft adapted to actuate a register such as indicated at 32 through a suitable gear train (not shown).

The slip ring 22 is connected to the field 9 through a conductor 33, and the slip ring 23 is connected to the field 10 through a conductor 34. The fields 9 and 10 are connected to one side of the source 11 through a conductor 35. When the speed of the arm 27 is the same as that of the extension 17 the contact 26 will be in spaced relation to the contacts 20 and 21 so that the fields 9 and 10 of the motor 8 are deenergized. When, however, the speed of the arm 27 is less than that of the extension 17 the contact 26 will engage the contact 20, energizing the field 9. Conversely when the speed of the arm 27 is greater than that of the extension 17 the contact 26 will engage the contact 21 energizing the field 10.

For varying the speed of the electro-responsive device 29 to maintain the arm 27 and extension 17 at synchronous speeds I show a resistance 36 positioned in unison with the arm 4 and cooperating with a stationary contact 37 to vary the impedance connected in circuit with the electro-responsive device 29. Increases in impedance serve to effect a decrease in speed of the extension 28, whereas decreases in impedance serve to increase the speed of the extension 28 in direct proportion to such increases and decreases. The arrangement is such that upon an increase in the rate of flow of fluid through the pipe 2, the speed of the member 12 will increase effecting engagement between the contacts 20 and 26 which will cause energization of the field 9 of the motor 8. Energization of the field 9 will cause rotation of the motor 8 in a direction to position the arm 4 upwardly, indicating an increase in the rate of flow of fluid. Simultaneously with the upward positioning of the arm 4 the resistance 36 will be angularly positioned to decrease the impedance in circuit with the device 29, thereby increasing the speed of the extension 28 until the angular velocity of the arm 27 is again equal to that of the extension 17, when the contact 26 will disengage the contact 20 and further positioning of the arm 4 will cease until there is a further change in the rate of flow of fluid through the pipe 2. Conversely upon a decrease in the rate of flow, the contact 26 will engage the contact 21 energizing the field 10, effecting a downward positioning of the arm 4 and a simultaneous angular positioning of the resistance 36 in a direction to increase the impedance in a circuit with the device 29, thereby effecting a decrease in the speed of the contact 26 until it is again equal to the speed of the extension 17.

To provide a further indication, recording, or integration of the rate of flow of fluid through the pipe 2 I may connect in circuit with the device 29 suitable exhibiting means such as the current responsive integrating meter 38, recording meter 39, and indicating meter 40, which may be located adjacent or remotely as desired from the displacement meter 1. Likewise I may obtain an integration or an indication of the total flow of fluid through the pipe 2 from the register 32. By the selection of proper graduations, constants and ratios, such instruments will exhibit the rate of flow of fluid or the total quantity of fluid as the case may be in desired units, such as pounds, pounds per hour, gallons, gallons per minute, or the like. Such devices are well known and per se form no part of my present invention.

As shown in Fig. 1 the arm 4 is positioned in proportion to changes in the resistance or impedance 36 and accordingly in non-linear functional relation to changes in current in the circuit of the device 29. It is likewise positioned in functional relation to changes in speed of the arm 27, extension 17 and flow of fluid through the pipe 2. Direct reading of flow or other variable being measured may be obtained from the position of the arm 4 by suitable non-uniform graduating of the chart 5 and index 6, which graduations may be further modified to compensate for further non-uniform relationships which may exist, or the arrangement shown in Fig. 3 may be used wherein the arm 4 pivotally supported at 41 is provided with an extension 42 forming a cam follower for a cam 43 driven by the shaft 7. The cam 43 may be shaped so that equal increments of change in flow will result in equal increments of travel of the arm 4, notwithstanding that such incremental changes require unequal incremental changes in the impedance introduced into the circuit of the device 29 before synchronism is reestablished between the extension 17 and arm 27.

At Fig. 4 I have shown a further modified form of apparatus for obtaining movement of the arm 4 directly proportional to changes in the magnitude of the rate of flow or other variable being measured. Therein I show secured to the shaft 7 and adapted to be angularly positioned thereby a resistance 36A having loops of non-uniform lengths so that equal angular movements of the shaft 7 produce unequal incremental changes in the impedance in circuit with the device 29. The resistance 36A may be shaped so that equal increments of motion of the shaft 7 produce equal incremental changes in speed of the device 29, or it may be shaped to produce any desired functional relation between increments of travel of the shaft 7, speed of the device 29, and the magnitude of the variable being measured.

In Fig. 5 I have shown a modified form of apparatus wherein I vary the current in the circuit of the device 29 through the agency of a movable element electron discharge device. Referring to Fig 5 I have therein shown a movable element electron discharge device 44 having a cathode 45, and an anode 46 mounted in a diaphragm or other flexible means 47 forming a wall of the device.

The resistance or impedance of the device 44 to the passage of current may be controlled by varying the effective area of the anode element 46 relative to the cathode element 45, or by varying the distance between the elements, or by physically otherwise changing the relationship between the elements. My invention contemplates moving one of the elements relative to the other to vary the effective area of one of the elements; or the distance between the elements; or some other physical dimension of the device to maintain the member 12 and extension 28 at synchronous speeds. It is to be understood therefore that by moving one of the elements relative to the other I mean any change in the physical relationship of the elements effective for producing a change in the resistance or impedance of the device.

I have shown the movable anode 46 secured to an arm 48 carried by the member 12 rotatable at a speed proportional to the rate of flow of fluid through the pipe 2 as explained with reference to Fig. 1. The cathode 45 is rigidly supported in the device 44 which is carried by an arm 49 secured to the extension 28 rotatable at a speed proportional to the current in the circuit of device 29. When the member 12 and extension 28 are rotating at synchronous speeds the cathode 45 and anode 46 remain in fixed physical relationship to each other. When however the speed of the member 12 increases, for example, the anode 46 will move relative to the cathode 45 in a direction to decrease the resistance or impedance of the device 45 to the passage of current; and conversely when the speed of the member 12 decreases the anode 46 will move in opposite direction to increase the resistance of the device 44 to the passage of current.

The cathode 45 is shown connected to one side of a suitable source 50 through a conductor 51 and the anode 46 is connected to the opposite side of the source 50 through a conductor 52. It is to be understood that the circuit arrangement shown in Fig. 5 is diagrammatic and that the anode 46 and cathode 45 may be connected to the conductors 51 and 52 through suitable slip rings such as I have diagrammatically illustrated at 53. The cathode 45 is heated through a transformer 54, the primary of which is connected across the source 50.

Connected in the cathode-anode circuit of the device 44 is the saturating winding 55 of a saturable core-reactor 56 having a saturable winding 57, connected in circuit with the electro-responsive devices 29, 38, 39, and 40. The current in the saturating winding 55 controls the impedance of the saturable winding 57, so that changes in current in the saturating winding 55 produce corresponding and proportionate changes in the current in the saturable winding 57. There is, however, no appreciable passing of power from the saturating winding 55 to the saturable winding 57, or vice versa, as occurs with an inductive coupling, such as a transformer having a primary and a secondary winding. Increases in current in the saturating winding 55 producing proportionate changes in current in the saturable winding 57 effect proportionate changes in the readings of the indicator 40, recorder 39, integrator 38 and speed of the extension 28.

In operation, upon an increase in speed of the member 12, for example, the anode 46 will move relative to the cathode 45 in a direction to decrease the resistance of the device 44 and accordingly increase the current in the saturating winding 55. The impedance of the saturable winding 57 will be decreased proportionately, causing a greater passing of current through the device 29 and an increase in speed of the extension 28 and device 44. The anode 46 will continue to be positioned relative to the cathode 45, increasing the speed of the extension 28 until it is again equal to that of the member 12. Conversely upon a decrease in speed of the member 12 the anode 46 will move relative to the cathode 45 in opposite direction, decreasing the speed of the extension 28 until it is again equal to that of the member 12. Likewise the exhibiting devices 38, 39 and 40 will be positioned in dependence upon the increase or decrease of current and so in accordance with changes in speed of the member 12 or rate of flow of fluid through the conduit 2.

Movements of the anode 46 relative to the cathode 45 necessary to restore synchronism are relatively small, in the order of a few thousandths of an inch, so that the member 12 and extension 28 continuously rotate at synchronous speeds; and a small change in phase relationship is sufficient to maintain synchronism upon a change in speed at the member 12. Consequently changes in the rate of flow of fluid are substantially instantaneously reflected in proportionate positioning of the exhibiting devices 38, 39, 40 and speed of the extension 28.

Figures 6, 8:
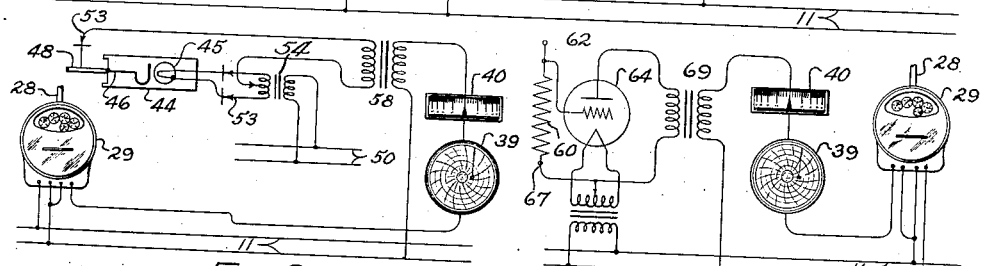
Fig. 6 is a modified form of circuit arrangement over that shown in Fig. 5.
Fig. 8 illustrates a modified form of circuit arrangement over that shown in Fig. 7.

In Fig. 6 I show a modified form of circuit arrangement. The output circuit of the device 44 is connected to the secondary winding of an inductive coupling, such as a transformer 58, the primary winding of which is connected in series circuit with the indicator 40, recorder 39 and device 29. As known the impedance of the primary winding will vary inversely with the current passing through the secondary winding, which is controlled by the position of the anode 46 relative to the cathode 45. Accordingly the transformer 58 will effect speed control of the device 29 in similar fashion to the saturable core reactor 56. Thus an increase in speed of the member 12 will position the anode 46 relative to the cathode 45 to decrease the resistance of the device 44 to the passage of current, increasing the current in the secondary of the transformer 58, effecting a proportionate decrease in the impedance of the primary winding and causing an increase in speed of the extension 28 until it is again equal to that of the member 12.

It is apparent that while in Figs. 5 and 6 I have shown the saturable core-reactor 56 and transformer 58 respectively directly connected to the output circuit of the device 44, I may if desired interpose suitable amplifying devices, such as electron discharge devices, to produce current changes having a magnitude sufficient to exercise desired control of the device 29.

Figure 7:
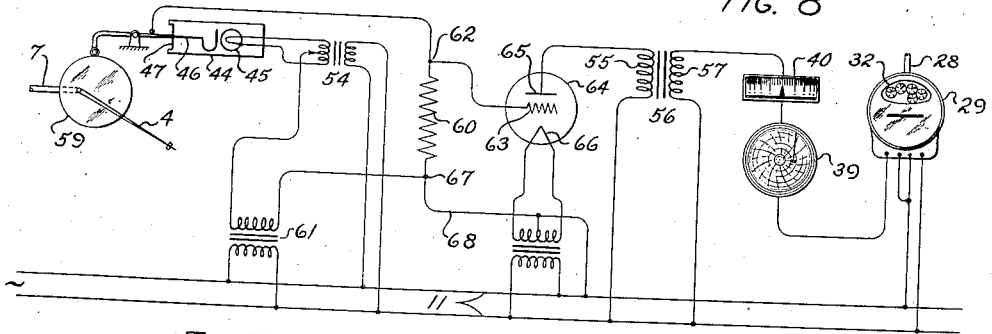
Fig. 7 is a diagrammatic illustration of a further modified form of my invention.

In Fig. 7 I have shown an arrangement wherein I have substituted the movable electron discharge device 44 for the resistance 36 as shown in Fig. 1 to control the speed of the extension 28 to maintain synchronism with the speed of the member 12. Therein I have shown a cam 59 positioned by the shaft 7 adapted to move the anode 46. The cam 59 may be shaped to produce any desired relation between increments of angular travel of the shaft 7 and changes in resistance of the device 44.

Included in the output circuit of the device 44 is a resistance 60 and a source of potential comprising the secondary of a transformer 61, the primary of which is connected to the source 11. A terminal 62 of the resistance 60 is connected to a grid 63 of an electron discharge device 64, having an anode 65 and a cathode 66. An opposite terminal 67 of the resistance 60 is connected to the cathode 66 through a conductor 68.

When the passage of current through the resistance 60 is relatively small, the grid 63 will be at substantially the same potential as the cathode 66, and the device 64 will conduct current. As the current flow through the resistance 60 increases, the potential of the grid 63 will fall below that of the cathode 66 in proportion to the increases in current in the resistance 60, rendering the device 64 proportionately less conducting.

Positioning of the anode 46 of the device 44 relative to the cathode 45 serves to vary the current in the resistance 60 inversely in proportion to the speed of the member 12. Accordingly the device 64 will be rendered more or less conducting in accordance with increases or decreases in speed of the member 12.

The saturating winding 55 is shown connected in the output circuit of the device 64 so that as it is rendered more conducting the current in the saturable winding 57 increases, increasing the speed of the extension 28 and positioning the exhibiting devices 39 and 40 in accordance with the increase of current and accordingly in proportion to the change in rate of flow through the pipe 2.

In operation, upon an increase in speed of the member 12 the shaft 7 of the motor 8 will be positioned in one direction, as explained with reference to Fig. 1. Positioning of the shaft 7 will move the anode 46 relative to the cathode 45 through the agency of the cam 59, effecting through the electron discharge device 64 and saturable core-reactor 56 an increase in current effective for increasing the speed of the extension 28, which operation will continue until the speed of the extension 28 is again equal to that of the member 12. Conversely upon a decrease in speed of the member 12, due for example to a decrease in flow through the pipe 2, the shaft 7 will be positioned in opposite direction producing a movement of the anode 46 to decrease the current through the device 29 and effecting a decrease in speed of the extension 28 until it is again equal to that of the member 12.

In Fig. 8 I have shown a modification of a portion of the circuit as shown in Fig. 7, wherein I employ an inductive coupling comprising a transformer 69 between the output circuit of the electron discharge device 64 and the circuit of the device 29. Changes in the grid-cathode potential relation of the electron discharge device 64 are accordingly effective for varying the current in the secondary winding of the transformer 69, producing corresponding variations in the impedance of the primary winding, thus increasing or decreasing the speed of the extension 28 proportionately.

While I have chosen to illustrate and describe my invention applied to the measurement of the rate of flow of a fluid, it is apparent that it can equally as well be adapted to a wide variety of other uses. For example, the member 12 could be operatively connected to a rotating shaft through suitable gears and the chart 5 and index 6 graduated to record and indicate respectively in R. P. M., and the register 32 to give the total number of revolutions up to the time of reading. It is to be understood therefore that the embodiment herein described is illustrative only.

What I claim as new, and desire to secure by Letters Patent of the United States, is:

1. Apparatus comprising a first member continuously rotatable at a speed proportional to the magnitude of a variable, a reversible motor having opposed windings, an electric circuit, a resistance in said circuit, means for varying said resistance actuated by said motor, a meter of the current in said circuit having a member continuously rotatable at a speed proportional to the magnitude of the current, cooperative contact means actuated by said members for controlling the energizing of the opposed windings of said motor in accordance with the relative positions of said members; and exhibiting means actuated by said motor.

2. Apparatus comprising a first member continuously rotatable at a speed proportional to the magnitude of a variable, a reversible motor having opposed windings, an electric circuit, a resistance in said circuit, means for varying said resistance actuated by said motor, a meter of the current in said circuit having a member continuously rotatable at a speed proportional to the magnitude of the current, cooperating contact means actuated by said members for controlling the energizing of the opposed windings of said motor in accordance with the relative positions of said members, a movable member, and means operated by said motor for moving said member in direct proportion to changes in said variable.

3. Apparatus comprising a first member continuously rotatable at a speed proportional to the magnitude of a variable, a reversible motor having opposed windings, an electric circuit, a resistance in said circuit, means for varying said resistance actuated by said motor, a meter of the current in said circuit having a member continuously rotatable at a speed proportional to the magnitude of the current, cooperating contact means actuated by said members for controlling the energizing of the opposed windings of said motor in accordance with the relative positions of said members, a cam positioned by said motor and an indicator actuated by said cam, said cam so shaped that the magnitude of the movements of said indicator are in direct proportion to the magnitude of the changes in said variable.

4. The combination with two separately driven members, of means for synchronizing the movements of said members comprising a movable element electron discharge device, the elements of which are relatively movable by said members, and means under the control of said device for varying the rate of movement of one of said members.

5. The combination with two separately driven members, of means for synchronizing the movements of said members comprising a movable element electron discharge device, the elements of which are relatively movable by said members, a current responsive device for driving one of said members; and means for varying the current in said device comprising an impedance controlled by said electron discharge device.

6. The combination with two separately driven members, of means for synchronizing the movement of said members comprising a movable element electron discharge device, the elements of which are relatively movable by said members, an output circuit for said device, electro-responsive means for driving one of said members, a circuit for said electro-responsive means, and an inductive coupling between the output circuit of said device and said circuit.

7. The combination with two separately driven members, of means for synchronizing the movement of said members comprising a movable element electron discharge device, the elements of which are relatively movable by said members, an output circuit for said device, electro-responsive means for driving one of said members, a circuit for said electro-responsive means and a saturable-core reactor between the output circuit of said device and said last-named circuit.

8. A rate of flow meter comprising in combination, a movable element electron discharge device, an output circuit for said device, a member movable in accordance with the rate of flow for moving one of the elements, an electric circuit, electro-responsive means connected in said circuit, a movable member for moving another of the elements of said device controlled by said electro-responsive means; and a saturable-core reactor connecting the output circuit of said device with said electric circuit.

9. In a rate of flow meter, in combination, an electron discharge device wherein the elements are relatively movable, an output circuit for said device, means for relatively moving said elements in accordance with changes in the rate of flow, exhibiting means positioned in accordance with the current in the output circuit of said device; and means for relatively moving said elements in accordance with changes in the position of said exhibiting means.

10. Apparatus comprising a member continuously rotating in one direction at a speed proportional to the magnitude of a variable, variable speed unidirectional electro-responsive means, a second rotatable member actuated by said responsive means, means under the joint control of said members for varying the current in said electro-responsive means to operate said second member in synchronism with said first member; and measuring means for the current in said electro-responsive means.

11. Apparatus comprising a shaft, means for continuously rotating said shaft in one direction at a speed proportional to the magnitude of a variable, a radially extending member secured to said shaft and adapted to be driven thereby, a second shaft co-axial with said first shaft, unidirectional variable speed current responsive electro means for continuously rotating said second shaft, a radially extending second member secured to said second shaft and adapted to be driven thereby, means under the joint control of said members for varying the current in said electro-responsive means to maintain said members at identical speeds, and measuring means of the current in said electro-responsive means.

12. The combination with two separately continuously rotating members, of means for rotating said members at synchronous speeds comprising a movable element electron discharge device, the elements of which are relatively movable by said members, and means under the control of said device for varying the rate of rotation of one of said members.

13. Apparatus comprising a member continuously rotating in one direction at a speed proportional to the magnitude of a variable, variable speed unidirectional electro-responsive means, a second rotatable member actuated by said responsive means, a movable element electron discharge device, means for relatively moving the elements of said device under the joint control of said members, and means under the control of said electron discharge device for varying the speed of said electro-responsive means.

14. Apparatus comprising a member continuously rotating in one direction at a speed proportional to the magnitude of a variable, variable speed unidirectional electro-responsive means, a second rotatable member actuated by said responsive means, a movable element electron discharge device, means for relatively moving the elements of said device under the joint control of said members; a second electron discharge device having an input and an output circuit, said input circuit under the control of said movable element electron discharge device; and means under the control of said output circuit for varying the speed of said electro-responsive means.

REW E. WOOLLEY.